United States Patent
Dai et al.

(10) Patent No.: US 11,739,708 B2
(45) Date of Patent: Aug. 29, 2023

(54) METHODS FOR TRANSIENT FUEL CONTROL COMPENSATION

(71) Applicant: Ford Global Technologies, LLC, Dearborn, MI (US)

(72) Inventors: Wen Dai, Northville, MI (US); Marcus Fried, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 127 days.

(21) Appl. No.: 17/451,615

(22) Filed: Oct. 20, 2021

(65) Prior Publication Data

US 2023/0122923 A1    Apr. 20, 2023

(51) Int. Cl.
| F02D 41/30 | (2006.01) |
| F02D 41/40 | (2006.01) |
| F02D 13/02 | (2006.01) |
| F02P 5/15  | (2006.01) |
| F02D 35/02 | (2006.01) |

(52) U.S. Cl.
CPC ..... F02D 41/3064 (2013.01); F02D 13/0215 (2013.01); F02D 35/025 (2013.01); F02D 41/401 (2013.01); F02P 5/1504 (2013.01); F02D 2200/0614 (2013.01); F02D 2200/0618 (2013.01)

(58) Field of Classification Search
CPC ............ F02D 41/3064; F02D 13/0215; F02D 35/025; F02D 41/401; F02D 2200/0614; F02D 2200/0618; F02P 5/1504
See application file for complete search history.

(56) References Cited

U.S. PATENT DOCUMENTS

| 5,642,722 A | 7/1997 | Schumacher et al. |
| 6,003,496 A | 12/1999 | Maloney |
| 7,051,715 B2 | 5/2006 | Chen et al. |
| 7,367,313 B2 | 5/2008 | Chang et al. |
| 8,113,180 B2 | 2/2012 | Jankovic et al. |
| 9,617,945 B2 | 4/2017 | Takahashi et al. |
| 9,863,345 B2 | 1/2018 | Wong et al. |
| 2005/0022755 A1* | 2/2005 | Hitomi ............... F02D 41/3029 123/58.8 |
| 2007/0144480 A1 | 6/2007 | Herweg et al. |
| 2010/0250096 A1* | 9/2010 | Yamada ............... F02D 41/401 123/447 |
| 2010/0268436 A1* | 10/2010 | Soejima ............... F02D 37/02 701/102 |
| 2018/0334987 A1* | 11/2018 | Shirahashi ............ F02D 35/023 |

FOREIGN PATENT DOCUMENTS

EP    0790407 A2 *    8/1997

* cited by examiner

*Primary Examiner* — Kurt Philip Liethen
(74) *Attorney, Agent, or Firm* — Vincent Mastrogiacomo; McCoy Russell LLP

(57) ABSTRACT

Methods and systems are provided for an engine for adjusting cylinder parameter settings to optimize engine output during a transient mode. In one example, a method may include adjusting cylinder parameter settings, including a cam timing setting, a spark timing setting, and a fuel injection timing setting based on a chamber temperature in response to a rate of fuel injection acceleration being greater than a positive threshold, thus indicating the engine is in the transient mode.

20 Claims, 6 Drawing Sheets

METHODS FOR TRANSIENT FUEL CONTROL COMPENSATION

FIELD

The present description relates generally to methods and systems for controlling a vehicle engine to adjust cylinder parameter settings for a transient mode.

BACKGROUND/SUMMARY

Vehicle engines use a variety of engine operating modes during vehicle operation, including a steady state mode and a transient mode. The transient mode may include conditions where an engine speed and or an engine load changes. The steady state mode may include conditions where engine operation is unchanged, e.g., engine speed is approximately constant and engine load is approximately constant. An example of the transient mode may be during vehicle acceleration, vehicle starting, load increase, etc. For example, operation in the transient mode may include a cold start where an aftertreatment device temperature is below a threshold temperature at which efficient exhaust gas treatment is enabled.

An engine operating mode may be determined using cylinder conditions, including engine speed rate, fuel injection acceleration, and real-time chamber temperature. Engine speed rate is a change in engine speed as derived from a crank position sensor and measured in RPM. Fuel injection acceleration is a change in engine load or torque as derived from fuel injection duration. Engine speed rate and fuel injection acceleration may be used to indicate when the engine is in the transient mode or the steady state mode. Real-time chamber temperatures are combustion chamber surface temperatures, which correlate with piston-top temperatures and may be calculated in real time by an engine control unit (ECU) or powertrain control unit (PCU). Real-time chamber temperatures may be used to quantify compensation of cylinder parameter settings during the transient mode.

Fuel injection acceleration may be dependent on engine speed rate as well as other engine conditions. When the engine speed increases, for example, during vehicle acceleration, fuel injection frequency increases. In other words, when RPM rate changes, fuel injection acceleration changes. The transient mode may be indicated when fuel injection acceleration is greater than a positive, non-zero threshold. For example, the threshold may be a nominal fuel injection acceleration used during the steady state mode. Although both RPM rate and fuel injection acceleration may be used to determine if the engine is in the transient mode or the steady state mode, reported RPM values may lag and the engine may actually be in the transient mode prior to indication based on the reported RPM values.

During conventional engine operation, steady state cylinder parameter settings are applied during the transient mode. Steady state cylinder parameter settings may be provided in look-up tables stored in a controller of the vehicle, where cylinder conditions are referenced to determine which cylinder parameter settings to apply. Cylinder parameter settings may include a fuel injection timing (e.g., pulse) setting, a spark timing setting for fuel ignition, and a cam timing setting to open/close intake and/or exhaust valves of the cylinder. Look-up tables may be designed by a vehicle manufacturer to optimize vehicle outputs (e.g., low emissions, efficient fuel economy) during the steady state mode. However, when steady state cylinder parameter settings are applied during a transient mode, engine operation may result in non-optimized outputs.

In an example where the transient mode is vehicle acceleration, increasing RPM while using steady state parameter settings for spark timing and cam timing may result in less efficient fuel combustion than when the engine is in the steady state mode. The less efficient combustion may result in a delay of response to user request for acceleration and increased emissions (soot, NOx, HC), as steady state cylinder parameter settings may be optimized for the steady state mode to keep emissions generation below a threshold or engine operation at a certain fuel economy efficiency.

Engine control is optimized for the steady state mode using steady state mapping data, for example, steady state test data, to optimize both $CO_2$ and exhaust emissions. For example, at certain engine states including engine speed (RPM), load, spark, cam, etc., during the transient mode, no adjustment to those controls might be conventionally made to optimize for tailpipe emissions; the same control parameters are applied to transient controls during cold-start and other drive cycles. As a result, feed-gas emissions for soot, NOx, HC, CO, and so on, are greater during the transient mode compared to during the steady state mode.

Other attempts to address adjusting cylinder parameter settings during the transient mode include controlling engine operation during speed transients based on real-time engine speed change rate and fueling rate. One example approach is shown by Chang et al. in U.S. Pat. No. 7,367,313B2. Therein, controls including injection timing, spark timing, throttle position, exhaust gas recirculation valve setting and exhaust recompression are synchronized to changes in current engine speed and concurrent changes in engine fueling rate.

However, the inventors herein have recognized potential issues with such systems. As one example, using engine speed rate to indicate the engine is in the transient mode may result in inaccurate estimations/measurements of cylinder conditions upon which to determine an amount of compensation (e.g., adjustment) of the cylinder parameter settings, due to RPM lag. As described above, fuel injection acceleration is coupled to engine speed rate; as engine speed rate increases, fuel injection acceleration increases to provide sufficient fuel injections for the increasing engine rotation. However, an increase in fuel injection acceleration may precede an increase in engine speed rate, hence RPM lag. If an engine control system begins adjusting cylinder parameter settings for the transient mode when the transient mode is indicated based on engine speed rate, the engine may be using un-adjusted cylinder parameter settings for a duration of the transient mode, which may result in non-optimized engine output (e.g., emissions, fuel economy, and so on).

In one example, the issues described above may be addressed by a method for adjusting a cylinder parameter setting based on a chamber temperature in response to a rate of fuel injection acceleration greater than a positive threshold. A ratio of piston temperature during the transient mode over a piston temperature during the steady state mode, e.g., chamber temperature, affects optimized engine output when other chamber conditions (e.g., RPM, engine load, cam timing, spark timing, etc.) are equal to chamber conditions during the steady state mode. Fuel injection acceleration is used to indicate that the engine is in the transient mode, which may allow for adjustment of cylinder parameter settings earlier in the transient mode compared to using the engine speed rate to indicate the transient mode. This may result in optimized engine emissions for a greater duration of the transient mode. Additionally, cylinder parameter settings, including a cam timing setting, a fuel injection timing setting, and a spark timing setting may be independently adjusted (e.g., at different times during the transient mode and by different adjustment amounts) based on the real-time chamber temperature to allow for optimized engine output when a desired engine output may be different for different types of transient modes (e.g., a low chamber temperature compared to a high chamber temperature. In this way, cylinder parameter settings may be adjusted for the transient mode, resulting in optimized engine output.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for adjusting cylinder parameter settings based on a real-time chamber temperature in response to fuel injection acceleration being greater than a positive threshold. A transient engine operating mode may be indicated by fuel injection acceleration being greater than the positive threshold. When steady state parameters are applied to a cylinder during transient engine operation, as is conventional, vehicle emissions may increase and fuel economy may decrease, as well as other non-optimal effects. Adjusting cylinder parameter settings during transient operation may be based on real-time chamber temperatures, as chamber temperatures may be different during transient operation compared to during steady state operation in such a way that affects achievement of optimized vehicle output. For example, during a transient operating condition where chamber temperature is less than chamber temperature during steady state operation, combustibility of fuel may decrease due to fuel mixing with colder air (e.g., air taken in from the atmosphere heated to a lower temperature by the cylinder at a lower temperature compared to a higher temperature during steady state operation). Additionally, fuel combustibility may decrease as a result of the fuel impinging on a comparatively cold cylinder wall. Reduced fuel combustibility may result in increased emissions, reduced fuel economy, and a delay in vehicle output, such as acceleration, when requested by a user or a vehicle controller. In this way, by adjusting cylinder parameter settings based on the chamber temperature in response to fuel injection acceleration being greater than the positive threshold, vehicle outputs including emissions, fuel economy, and acceleration response may be optimized during transient engine operating states. Optimized responses may be determined by a vehicle operator or manufacturer, in one example.

Figure 1:
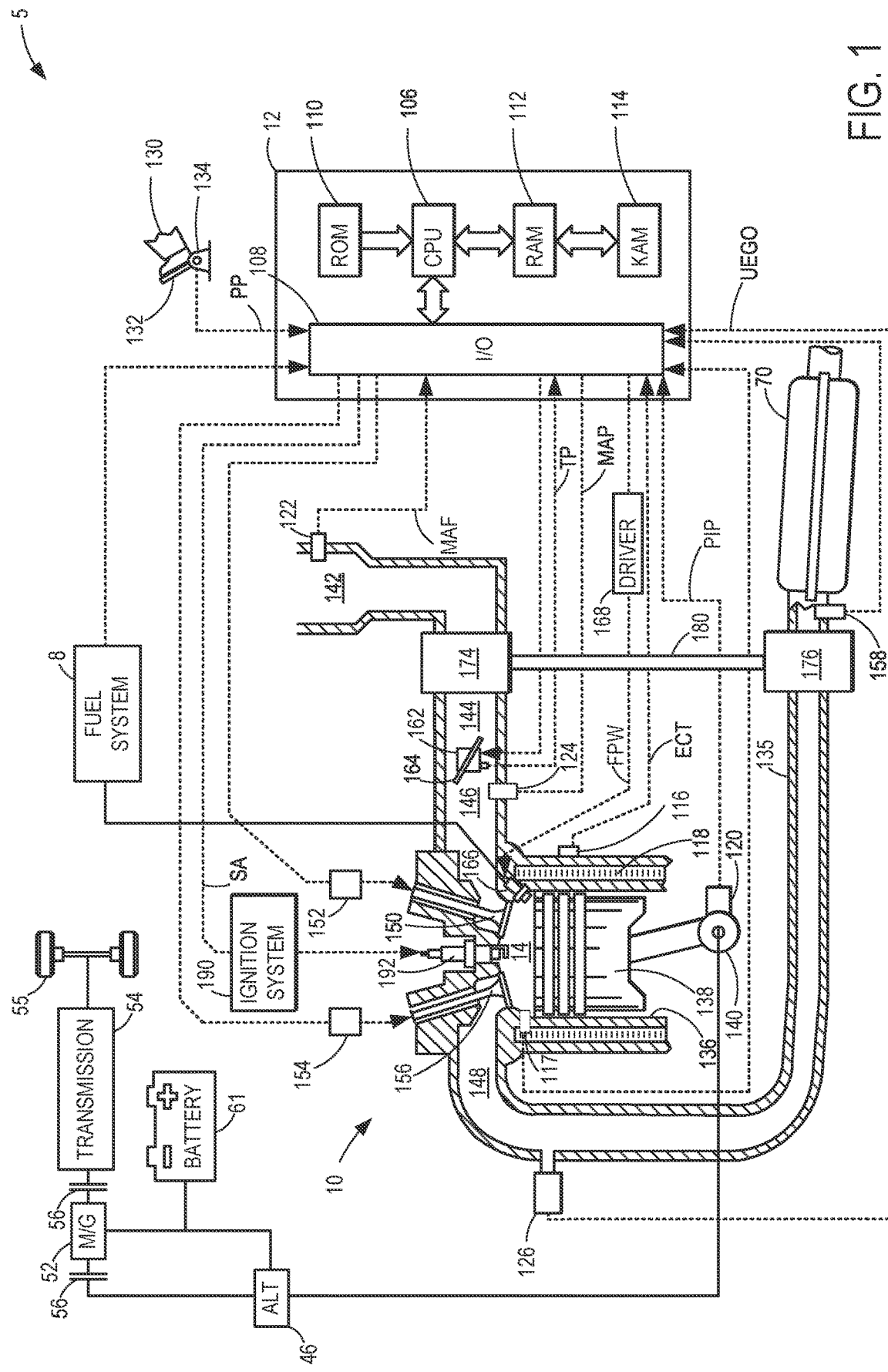
FIG. 1 illustrates a schematic of an engine included in a vehicle.
Figure 5:
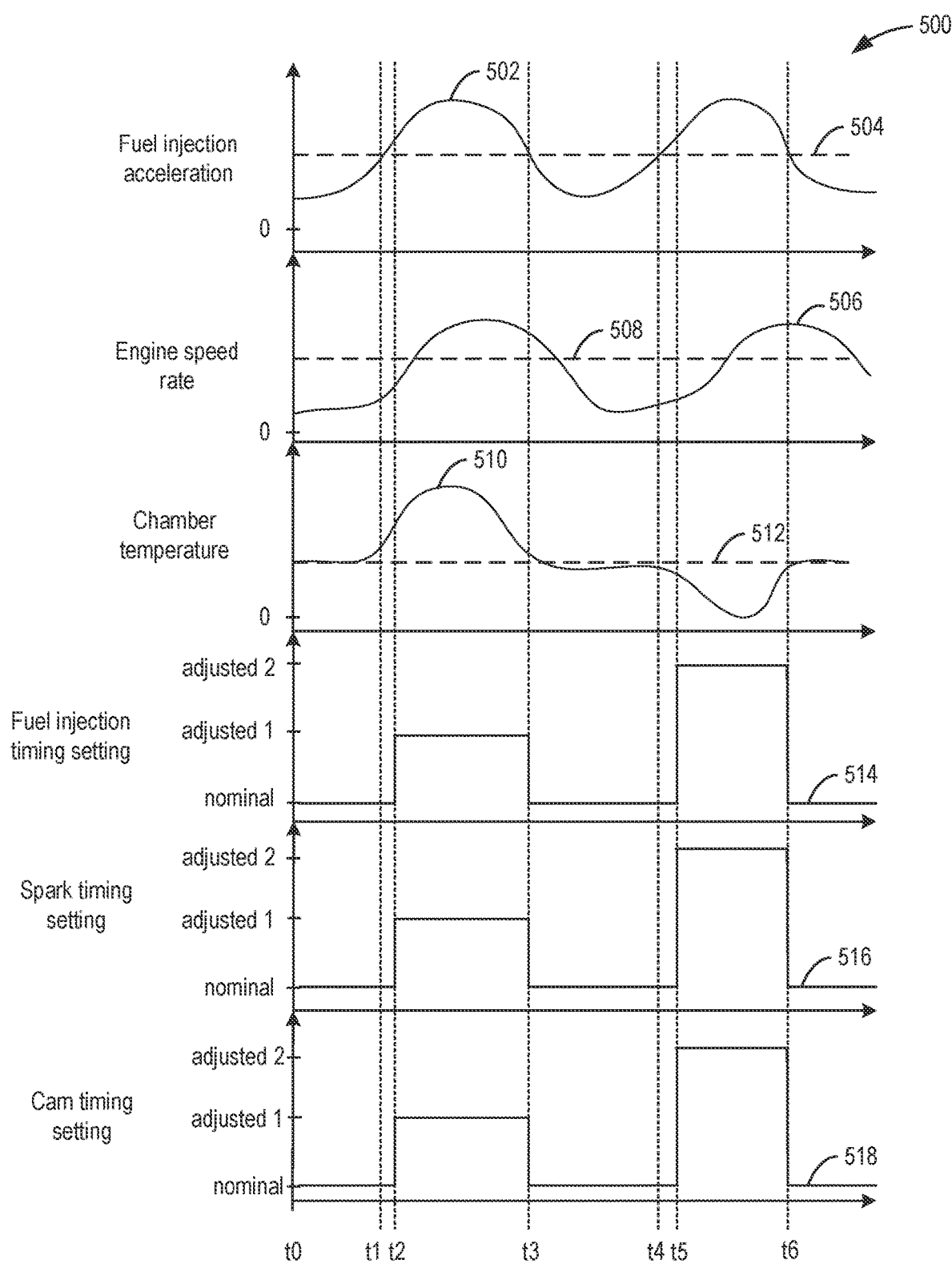
FIG. 5 shows an example timing diagram including variations in cylinder parameter settings based on chamber temperature and fuel injection acceleration.

FIG. 1 shows an example schematic of an engine included in a vehicle. The methods described herein may also be implemented in other vehicle types, such as a vehicle using gasoline, propane, biodiesel, etc., or a hybrid electric vehicle (e.g., including an internal combustion engine and at least one electric motor/generator). The engine of FIG. 1 includes a cylinder to which fuel may be injected and fuel injection acceleration is measured to determine if the engine is in a transient operation mode. Additionally, an engine speed (RPM) rate may be measured, e.g., at a crankshaft, to further determine if the engine is in the transient operating mode. However, as indication of engine operating mode by RPM rate may lag compared to indication by fuel injection acceleration, as shown in FIG. 5, the latter may be used as an identifier of engine operating mode. Temperature of the cylinder may be measured to determine which cylinder parameter settings to adjust and how to adjust the cylinder parameter settings. Adjusting cylinder parameter settings may include adjusting a spark timing setting to actuate a spark plug of the cylinder, adjusting a cam timing setting to adjust opening and closing of intake and exhaust valves of the cylinder, and adjusting a fuel injection timing setting to adjust a frequency of fuel injection.

Figure 2:
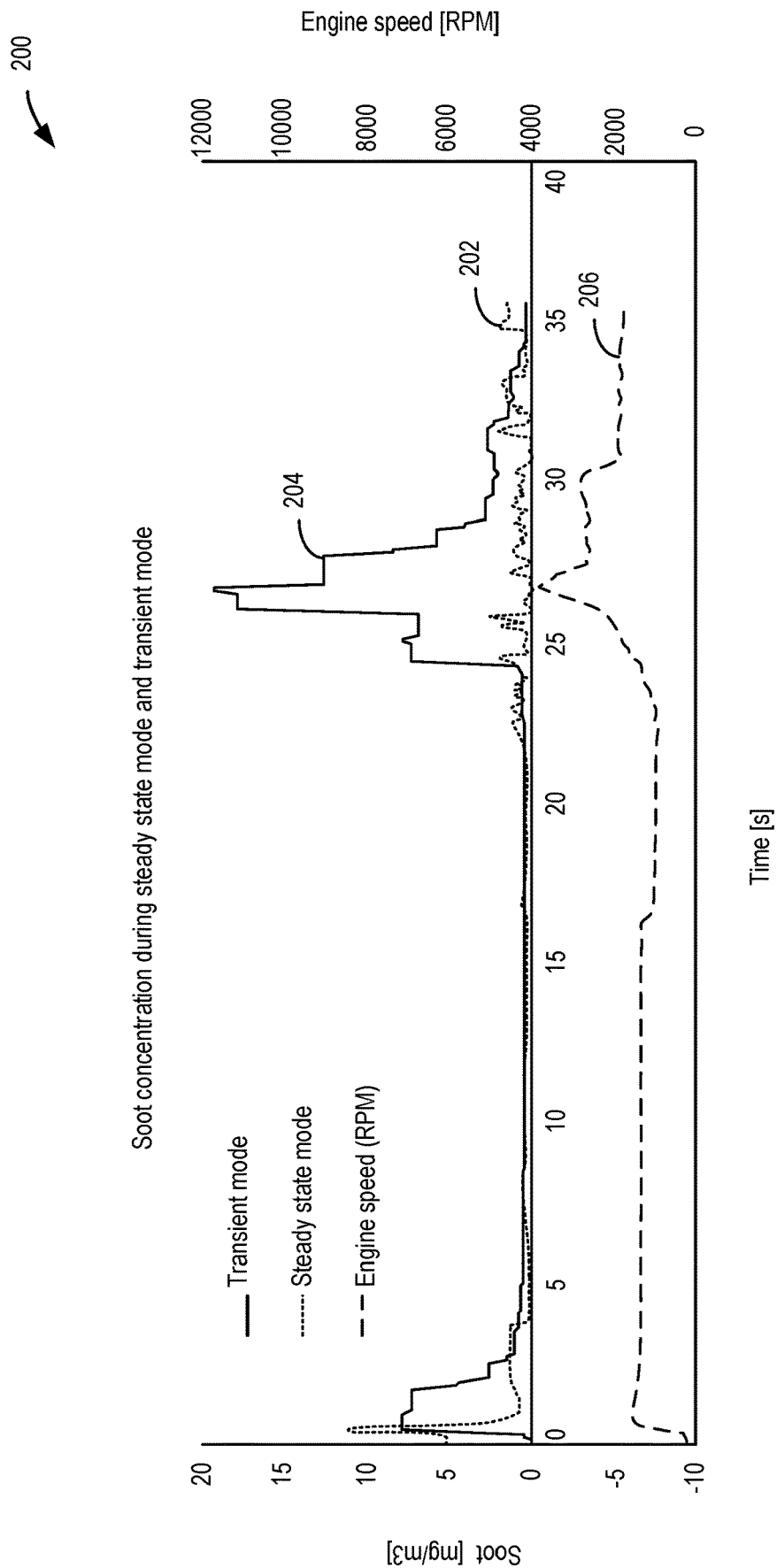
FIG. 2 shows an example graph comparing engine soot output when steady state cylinder parameter settings are applied during a steady state engine operating mode and a transient engine operating mode.

Conventionally, steady state cylinder parameter settings are applied during transient engine operation, which may result in increased emissions, for example, soot emissions, during transient engine operation. FIG. 2 shows a comparison of soot output during transient engine operation and steady state engine operation when steady state cylinder parameter settings are applied to both operating modes. FIG. 2 additionally shows engine speed in RPM during transient engine operation. As shown by FIG. 2, soot emissions may increase when steady state cylinder parameter settings are applied to an engine in a transient operating mode.

Figure 3:
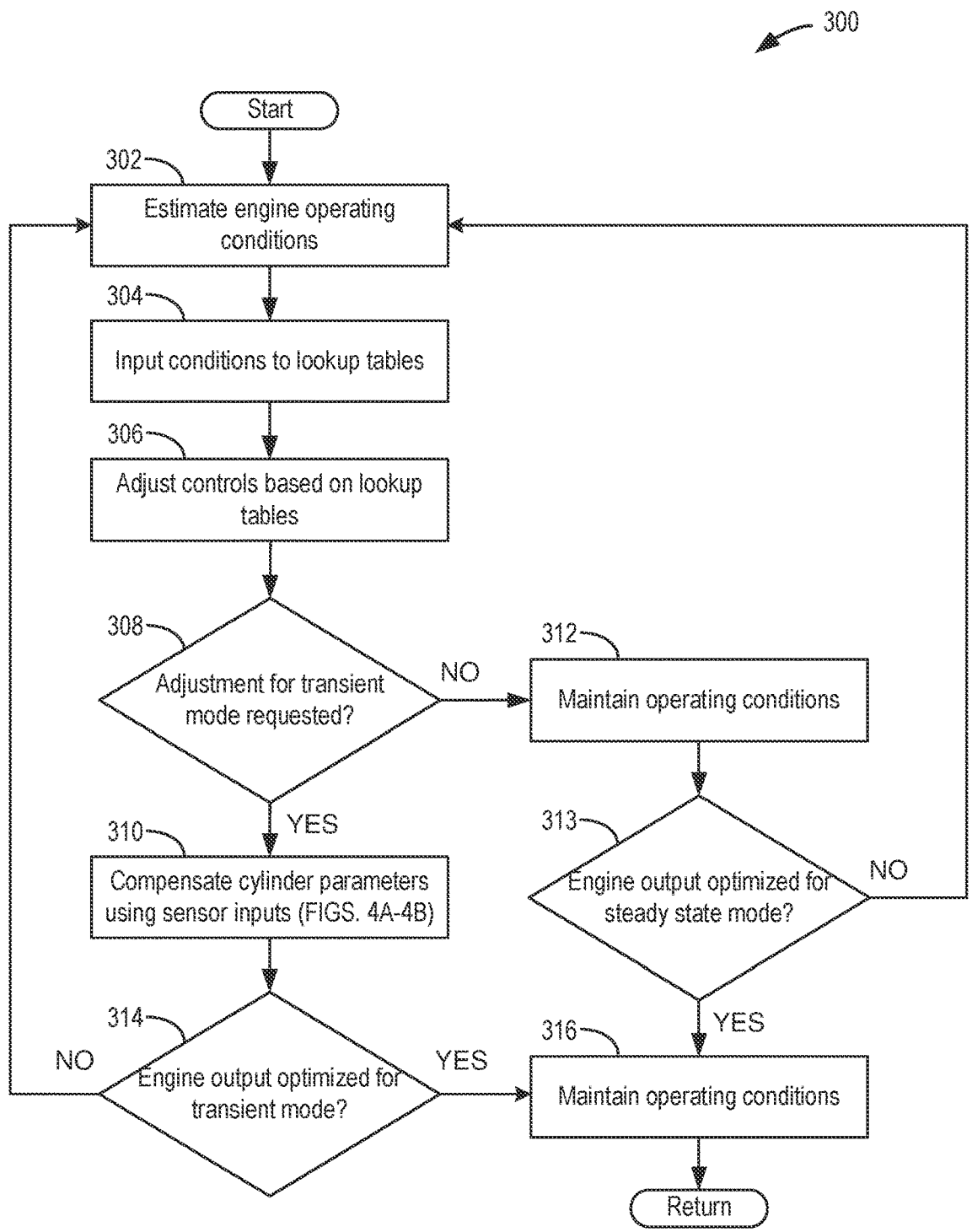
FIG. 3 shows an example method for adjusting cylinder parameter settings during the transient engine operating mode.
Figure 4A:
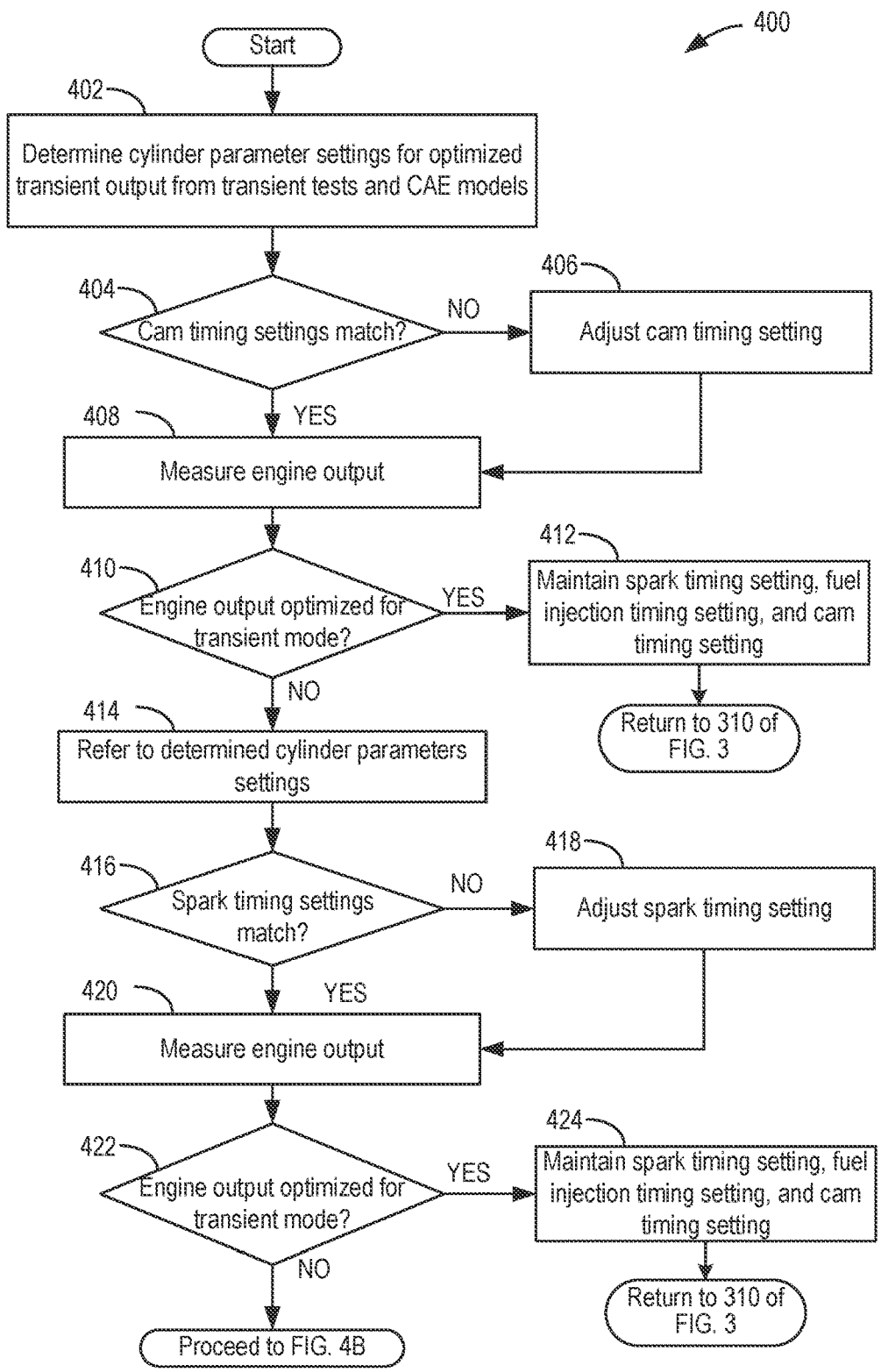
FIGS. 4A-4B show an example method for compensating cylinder parameter settings using sensor inputs.
Figure 4B:
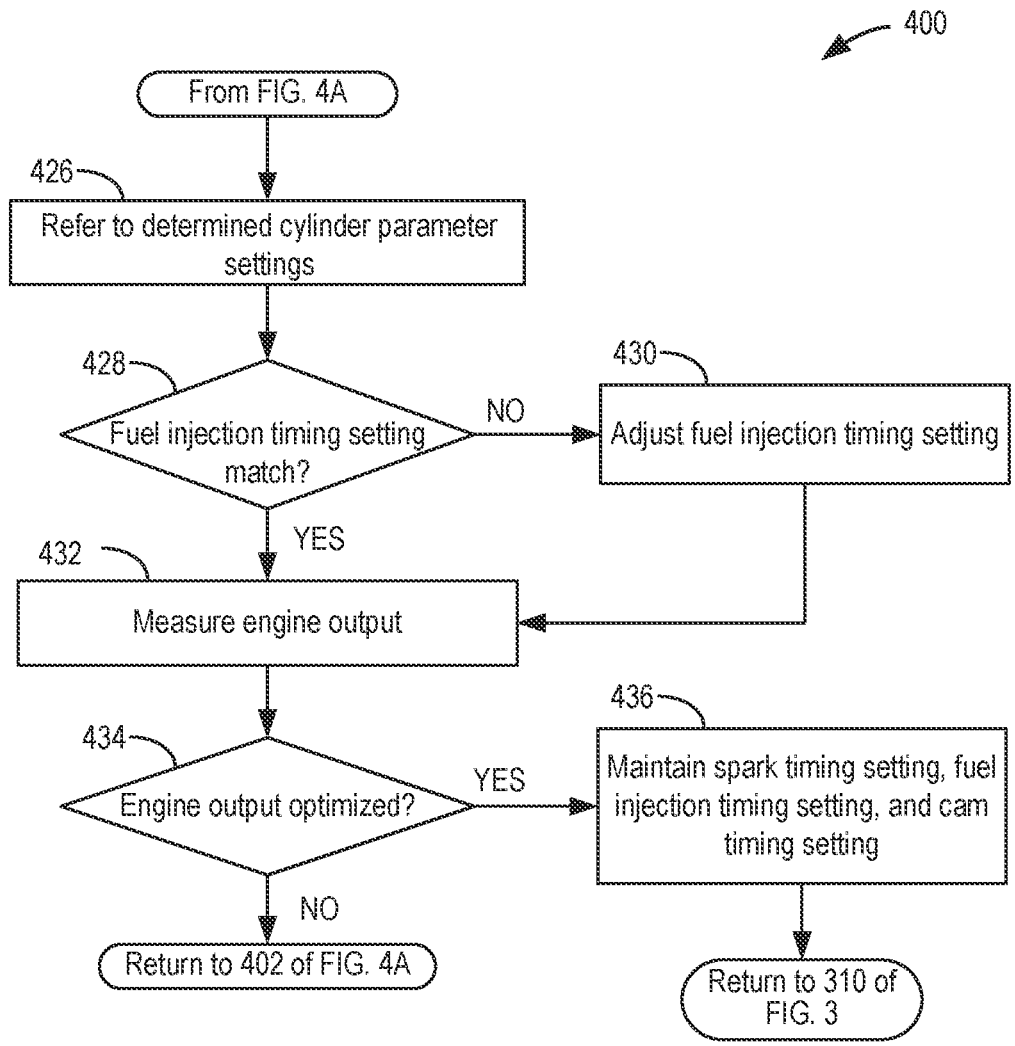

FIG. 3 shows an example method for adjusting cylinder parameter settings during a transient operating mode based on a request for adjustment as indicated by fuel injection acceleration being greater than the positive threshold. FIGS. 4A-4B elaborate on the example method of FIG. 3 and show an example method for compensating cylinder parameter settings using sensor inputs. Steady state cylinder parameter settings may be adjusted based on cylinder temperature to establish optimum operating conditions and vehicle output, such as low emissions and high fuel economy, during transient engine operation. An example timing diagram showing adjustments of cylinder parameter settings from nominal (e.g., steady state cylinder parameter settings) according to the method of FIGS. 3-4B is shown in FIG. 5.

Turning to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutch 56 is engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 61 may be a traction battery that delivers electrical power to electric machine 52 to provide torque to vehicle wheels 55. In some embodiments, electric machine 52 may also be operated as a generator to provide electrical power to charge system battery 61, for example, during a braking operation. It will be appreciated that in other embodiments, including non-electric vehicle embodiments, system battery 61 may be a typical starting, lighting, ignition (SLI) battery coupled to an alternator 46.

Alternator 46 may be configured to charge system battery 61 using engine torque via crankshaft 140 during engine running. In addition, alternator 46 may power one or more electrical systems of the engine, such as one or more auxiliary systems, including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based on system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from the engine, and exhaust turbine 176 may be optionally omitted. In still other examples, engine 10 may be provided with an electric supercharger (e.g., an "eBooster"), and compressor 174 may be driven by an electric motor.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust manifold 148 can receive exhaust gases from other cylinders of engine 10 in addition to cylinder 14. An exhaust gas sensor 126 is shown coupled to exhaust manifold 148 upstream of an aftertreatment device 70. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Aftertreatment device 70 may be a three-way catalyst, a NOx trap, various other emission control devices, or combinations thereof. Where the engine 10 is a diesel engine, aftertreatment device 70 may be a selective catalytic reduction system (SCR) with a diesel particulate filter positioned upstream of the SCR in a direction of exhaust gas flow.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an intake actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals (e.g., cam timing settings) provided to actuators 152 and 154 to control the opening and closing of the respective intake and exhaust valves. For example, valve actuators may be a cam actuation type and the intake and exhaust valve timing may be controlled concurrently, and any of a possibility of variable intake cam timing, variable exhaust cam timing, dual independent variable cam timing, or fixed cam timing may be used in conjunction with multiple cam profiles or oscillating cams. In some examples, the cam actuation system may be a single cam and may utilize one or more of cam profile switching (CPS), variable cam timing (VCT), variable valve timing (VVT), and/or variable valve lift (VVL) systems that may be operated by controller 12 to vary valve operation. In one example, the cam actuation system may include additional tappets coupling the intake/exhaust valves to a camshaft where the additional tappets are configured to selectively couple and decouple the valves to and from the camshaft. In this way, actuation of the intake/exhaust valves may be enabled independent of rotation of the camshaft. In yet other examples, a camless system may be used and the actuators 152, 154 may be electronically controlled. For example, the valves may be electro-pneumatic valves, electro-hydraulic valves, or electromagnetic valves.

An exhaust gas recirculation (EGR) system (not shown) may route a desired portion of exhaust gas from the exhaust manifold 148 to the intake manifold 144 via an EGR passage. EGR reduces pumping work of an engine resulting in increased fuel economy. In addition, EGR effectively cools combustion chamber temperatures thereby reducing NOx formation and improving emissions quality. EGR may also be used to regulate the temperature of the air-fuel mixture within the combustion chamber, thus providing a method of controlling the timing of ignition during some combustion modes. In the depicted example, the EGR delivered may be a low-pressure EGR (LP-EGR), wherein a portion of exhaust gas from the exhaust manifold 148 may be delivered from downstream of the exhaust turbine 176 to the engine intake manifold 144, upstream of a turbocharger compressor 174. In an alternate example, the EGR delivered may be a high-pressure EGR (HP-EGR), wherein a portion of exhaust gas from the exhaust manifold 148 may be delivered from upstream of the exhaust turbine 176 to the engine intake manifold 144, downstream of a turbocharger compressor 174.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, the compression ratio may be increased when different fuels are used. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed and engine load, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8 when the controller sends a signal (e.g., fuel injector setting) to the fuel injector to inject fuel. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and may be further configured to inject this fuel mixture directly into cylinder 14. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as Eli) (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling. In the present example, fuel system 8 may hold diesel fuel and engine 10 may be a diesel engine.

Controller 12, which may include a powertrain control module (PCM), is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of exhaust gas recirculation percentage (EGRP); intake manifold charge temperature (MCT); inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; a throttle position signal (TP) from a throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of aftertreatment device 70 based on the signal received from temperature sensor 158. In another example, a cylinder temperature may be measured by a cylinder temperature sensor 117 positioned in the cylinder 14.

Controller 12 receives signals from the various sensors of FIG. 1, processes the received signals, and employs the various actuators of FIG. 1 (e.g., fuel injector 166 and spark plug 192) to adjust engine operation based on the received signals and instructions stored on a memory of the controller. For example, the controller may receive a request for slowing of the vehicle based on input from the accelerator pedal (e.g., the accelerator pedal is released). In response to the request, the controller may command fuel injection at one or more cylinders to stop, thereby reducing fuel consumption during a period where torque is not demanded.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders, referred to in the following description as a plurality of cylinders. Further, each of these cylinders can include some or all of the various components described and depicted by FIG. 1 with reference to cylinder 14.

The engine of FIG. 1 may use a variety of engine operating modes during vehicle operation, including a steady state mode and a transient mode. The transient mode may include conditions where an engine speed and or an engine load changes. The steady state mode may include conditions where engine operation is unchanged, e.g., engine speed is approximately constant and engine load is approximately constant. An example of the transient mode may be during vehicle acceleration, vehicle starting, load increase, etc. For example, the transient mode may be a cold start where an aftertreatment device temperature is below a threshold temperature at which exhaust gas treatment is nominal.

The operating mode of the engine may be indicated by engine speed (RPM) rate and by fuel injection acceleration. RPM rate may be determined using a crankshaft position sensor (e.g., the Hall effect sensor 120 of FIG. 1), and an increasing or decreasing RPM (e.g., a changing RPM rate) may indicate the transient mode. Fuel injection acceleration, e.g., a change in engine load or torque which may be derived from a fuel injection duration, may be based on the RPM rate and an engine load (e.g., as determined by MAP), as well as other engine conditions. For example, fuel injection is measured in units of a fuel amount per engine cycle, therefore the rate of change of fuel injection is fuel amount per cycle per second. When the RPM increases, for example, during vehicle acceleration, fuel injection frequency increases. In other words, when RPM rate changes, fuel injection acceleration changes. A transient mode may be indicated when fuel injection acceleration is greater than a positive, non-zero threshold. For example, the threshold may be nominal fuel injection acceleration used during the steady state mode. Although both RPM rate and fuel injection acceleration may be used to determine if the engine is in the transient mode or the steady state mode, reported RPM values may lag and a transient mode may occur prior to reported RPM values. For example, a threshold fuel injection acceleration for indicating the transient mode may be less than fuel injection acceleration when RPM rate is greater than a positive threshold indicating the transient mode, as further explained in FIG. 5.

During conventional engine operation, steady state cylinder parameter settings are applied during the transient mode. Steady state cylinder parameter settings may be based on look-up tables stored in a controller of the vehicle, where cylinder conditions are referenced to determine which cylinder parameter settings to apply. Cylinder parameter settings may include a fuel injection timing (e.g., pulse) setting, a spark timing setting for fuel ignition, and a cam timing setting to open/close intake and/or exhaust valves of the cylinder. Look-up tables may be designed by a vehicle manufacturer to optimize vehicle outputs (e.g., low emissions, efficient fuel economy) during the steady state mode. However, when steady state cylinder parameter settings are applied during a transient mode (e.g., when cylinder conditions are different than during the steady state mode), engine operation may result in non-optimized outputs.

In an example where the transient mode is vehicle acceleration, increasing RPM while using steady state parameter settings for spark timing and cam timing may result in less efficient fuel combustion than when the engine is in the steady state mode. The less efficient combustion may result in a delay of response to user request for acceleration and increased emissions (soot, NOx, HC), as steady state cylinder parameter settings may be optimized for the steady state mode to keep emissions generation below a threshold or engine operation at a certain fuel economy efficiency.

FIG. 2 shows a graph 200 comparing engine soot output when using steady state cylinder parameter settings under a steady state mode and under a transient mode for a 2.0 L model predictive control (MPC) engine. The graph 200 includes a first plot 202 showing soot concentration in exhaust during the steady state mode, where the steady state mode is determined by referencing a steady state look-up table. A second plot 204 shows soot concentration in exhaust during the transient mode, where the transient mode is determined by referencing a transient test. A third plot 206 shows engine speed in RPM during the transient mode. Time increases in seconds from left to right along the abscissa and values increase moving up the ordinate, where soot concentration is shown on the left ordinate in mg/m3 and engine speed is shown on the right ordinate in RPM.

Between 0 and 5 seconds, RPM increases then is approximately constant, as shown by the third plot 206. Soot concentration increases during both the steady state mode as shown by the first plot 202 and the transient mode as shown by the second plot 204. The first plot 202 peaks and decreases to a low soot concentration (e.g., approximately 1 mg/m3) in approximately one second. The second plot 204 increases to a peak soot concentration less than that of plot 202, then gradually decreases to the low soot concentration of approximately 1 mg/m3. Both the first plot 202 and the second plot 204 show relatively low soot concentrations of less than 1 mg/m3 from 5 seconds to 20 seconds as engine speed remains at approximately 1750 RPM. As engine speed begins to increase at 22 seconds, the second plot 204 (e.g., showing soot concentrations during the transient mode using steady state cylinder parameter settings) increases to a peak of almost 20 mg/m3. The first plot 202 (e.g., showing soot concentrations during the steady state mode using steady state cylinder parameter settings) remains below approximately 2.5 mg/m3. RPM may not increase during the steady state mode.

Graph 200 shows that steady state cylinder parameter settings may be optimized for the steady state mode and result in low emissions, such as low soot concentration. When the steady state cylinder parameter settings are applied to non-steady state modes, such as the transient mode where RPM increases, steady state cylinder parameter settings may not be optimized for changing RPM and an increased soot concentration may result during the transient mode. For example, applying steady state cylinder parameter settings during the transient mode may include maintaining a cam timing setting, a spark timing setting, and a fuel injection timing setting nominal (e.g., using steady state cylinder parameter settings) while RPM increases. In this example, intake valve and exhaust valve opening/closing, as determined by the cam timing setting, may be out of alignment with increased RPM. For example, exhaust valves may be closed during an exhaust stroke when the exhaust stroke occurs earlier during transient mode than during steady state mode as a result of increased RPM. Similarly, intake valves may be closed during an intake stroke when the intake stroke occurs earlier during transient mode, which may result in incomplete fuel combustion as the AFR in the cylinder may be non-ideal. Incomplete fuel combustion may result in increased soot concentration in vehicle exhaust, as shown in FIG. 2. Other emissions like NOx and HC may also be increased. A method is desired for adjusting cylinder parameter settings during a transient mode to optimize engine operation. Adjusting cylinder parameter settings may increase fuel combustibility, decrease emissions, and increase fuel economy.

Described herein is a method for controlling an engine, comprising adjusting cylinder parameter settings based on a chamber temperature in response to a fuel injection acceleration greater than a positive threshold. The fuel injection acceleration being greater than the positive threshold indicates the engine is in a transient mode and fuel injection acceleration may be used as a transient indicator instead of RPM due to RPM lag. In one example, both RPM and fuel injection acceleration may be used to indicate a transient mode. Adjusting cylinder parameter settings may include adjusting a cam timing setting, a spark timing setting, a fuel injection timing setting, iVCT, throttle, and so on. Adjusting cylinder parameter settings may further include using transient test data, CAE predictions, and data mining from machine learning methods to determine optimized cylinder parameter settings for the transient mode. Cylinder parameter settings may be adjusted from parameters used during the steady state mode, which may be determined using steady state look-up tables.

Cylinder parameter settings may be adjusted based on chamber temperature as chamber temperature, including temperature of the chamber itself as well as air inside the chamber, may be a deciding factor in fuel combustibility. In one example, the transient mode includes a low chamber temperature, e.g., a temperature less than a chamber temperature during the steady state mode. If steady state cylinder parameter settings are applied during the transient mode when the cylinder temperature is low, injected fuel may be less combustible as fuel may impact a cold cylinder wall or mix with cold air in the cylinder. The less combustible conditions may result in a delay of response to user request for acceleration and increased emissions (soot, NOx, HC).

Inputting a real-time chamber temperature into a look-up table or mathematical equation and selecting a desired optimized output, for example, an emissions level, a desired fuel economy, etc., may allow for quantifying a difference between the real-time chamber temperature and the steady state cylinder temperatures. The look-up table or mathematical equation may provide cylinder parameter settings to be used relative to the real-time chamber temperature to achieve the desired optimized output for the transient mode.

FIG. 3 shows an example method 300 for adjusting cylinder parameter settings during a transient mode to optimize engine operation and output. Instructions for carrying out method 300 and the rest of the methods included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, method 300 includes estimating engine operating conditions. Engine operating conditions may include, for example, operator torque demand, engine speed (RPM), RPM rate, vehicle speed, engine coolant temperature (ECT), engine head temperature (EHT), engine load, ambient conditions (such as ambient humidity, temperature, and barometric pressure), exhaust temperature, manifold pressure (MAP), manifold air flow, battery state of charge, crankshaft position, fuel rail pressure, a status of a fuel injector, fuel injection acceleration, throttle position, manifold charge temperature (MCT), variable cam timing (iVCT), EGRP, and so on.

At 304, method 300 includes inputting engine conditions estimated at 302 into steady state look-up tables. The look-up tables may include tables for fuel injection timing settings, spark timing settings, and cam timing settings. For example, engine conditions may be input into the look-up tables and the look-up tables may indicate cylinder parameter settings to be used for the input engine conditions to achieve a pre-determined optimized output for the steady state mode.

At 306, method 300 includes adjusting controls (e.g., cylinder parameter settings) based on look-up table values from 304. Adjusting cylinder parameter settings may include adjusting at least one of a spark timing setting, an iVCT (e.g., cam timing) setting, a throttle position setting, and a fuel injection timing setting to a timing or position used to optimize vehicle output at the input engine conditions as set by the look-up tables. Optimized output may be indicated by a vehicle manufacturer or by a user and may include emissions level (e.g., soot, NOx, HC) and fuel economy.

At 308, method 300 includes determining if an adjustment for a transient mode is requested. A request for the adjustment for the transient mode may be indicated based on fuel injection acceleration being greater than a first positive, non-zero threshold. In one example, the first threshold is 2.5 gm/s$^2$ such that, when fuel injection acceleration is greater than or equal to 2.5 gm/s$^2$, the engine may be in the transient mode. In another example, the transient mode may be indicated when fuel injection acceleration is less than −2.5 gm/s$^2$. Additionally, the adjustment for the transient mode may be requested when a vehicle speed (RPM) rate is greater than a second positive, non-zero threshold, where the second threshold may be 300 RPM/s, in one example. In another example, the transient mode may be indicated when the RPM rate is less than −300 RPM/s. As described above, fuel injection acceleration is coupled to RPM rate and, due to RPM lag, fuel injection acceleration may indicate the engine is in the transient mode prior to indication of the transient mode based on the RPM rate intersecting the second threshold. Therefore, fuel injection acceleration is used at 308 to indicate the engine is in the transient mode, as further described in FIG. 5.

As described above, when the engine is in the transient mode and steady state cylinder parameter settings are used, the engine may have non-optimized output, for example, high emissions (e.g., soot, NOx, HC), and inefficient fuel economy. Therefore, when the transient mode is indicated, adjustment may be requested to adjust cylinder parameter settings to allow for optimized output during the transient mode.

If adjustment for the transient mode is requested at 308, at 310, method 300 includes compensating cylinder parameter settings using sensor inputs. Compensating cylinder parameter settings may include further adjusting controls determined based on steady state look-up tables at 306 using inputs from sensors described above, including MAP, MCT, iVCT, RPM, and EGRP. In one example, controls including the spark timing setting, the cam timing setting, and the fuel injection timing setting may be adjusted based on real-time cylinder temperature. For example, when real-time cylinder temperature is lower than the corresponding steady-state temperature (e.g., as shown in the steady-state look up table), a greater amount of fuel injected into the cylinder may stick to the cylinder walls and less fuel may be rebounded off of the cylinder walls, resulting in leaner and less homogenous air-fuel mixtures and greater exhaust emissions (of soot, HC, CO, etc.) compared to when the same amount of fuel is injected during the steady state mode. In order to achieve optimized engine output and engine operation, a frequency of fuel injections may be increased to increase combustibility of fuel. Since the real-time cylinder temperature is less than the corresponding steady-state temperature, spark timing may be advanced in the cylinder cycle by adjusting the spark timing setting. Lower cylinder temperatures may decrease risk of engine knock and allow spark timing setting to be advanced closer to maximum brake torque (MBT), resulting in more fuel-efficient engine operations. Independent variable cam timing (iVCT) may be adjusted to adjust intake and exhaust gas flow using intake values and exhaust valves, respectively. Adjusting iVCT may include delaying exhaust gas flow out of the cylinder or re-inducting exhaust gas back into the cylinder to allow exhaust gases another opportunity at combustion, which may reduce soot concentration or other pollutants in exhaust gas released to the atmosphere.

Another example of adjusted controls, at 310, includes more accurate fuel injection and optimized spark timing during transient events, when engine speed and cam timing may change within an engine cycle. In such instances, using steady-state lookup tables alone may provide less precise results.

Adjusted controls, at 310, may be used to compensate for steady state controls by adjusting the steady state controls using a difference between transient mode controls and the steady state controls; or the transient controls, at 310, may entirely replace the steady state controls by eliminating creation and use of the steady-state lookup tables at 306.

An amount of adjustment to the controls (e.g., the spark timing setting, the fuel injection timing setting, the cam timing setting) may be determined using transient test data, in one example. Transient tests may be designed, during which the control signals may be varied during drive-cycles, and engine tailpipe emissions are recorded along with engine states. CAE models may be used to generate/predict additional physical parameters for the corresponding transient tests, such as in-cylinder residual gas, piston temperatures, exhaust manifold oxidation rates (e.g., of HC and CO, etc.), catalyst light-off states (including brick temperatures, oxidation rates, etc.), a ratio of transient piston temperature over steady-state (SS) piston temperature (at the same engine state in RPM, load, spark, cam, etc.), and so on. Data resulting from the transient tests may result in a Big Data set, from which optimized cylinder parameter settings may be determined for optimized outputs, e.g., lowest tailpipe emissions during the transient mode. Further details regarding adjusting cylinder parameter settings for the transient mode are described in FIGS. 4A-4B.

At 314, method 300 includes determining if the engine output is optimized for the transient mode. Optimized engine output may be different for the steady state mode compared to the transient mode. For example, optimized output for the steady state mode and the transient mode may include different emissions levels (e.g., different soot concentrations in exhaust gas), different fuel economy, or a different weighted average of fuel economy and emissions. A measured value of engine output may be compared to the optimized engine output as pre-determined by a vehicle manufacturer or engine control system, as described above. Engine output may be measured as described in method 400 of FIGS. 4A-4B, described below, and the value measured in method 400 may be used to determine if the engine output is optimized for the transient mode at 314 of FIG. 3. If the engine output is determined to be optimized for the transient mode, at 316, method 300 includes maintaining current operating conditions. If the engine output is not optimized for the transient mode, method 300 returns to 302 to estimate engine conditions and further adjust controls as described in method 300 to achieve optimized engine output.

If, at 308, it is determined that adjustment for the transient mode is not requested, at 312, method 300 includes maintain current operating conditions. Operating conditions maintained at 312 may include cylinder parameter settings based on engine operating conditions and steady state look-up tables at 306.

At 313, method 300 includes determining if the engine output is optimized for the steady state mode. As described above with respect to 314, optimized engine output may be different for the steady state mode compared to the transient mode. A measured value of engine output may be compared to the optimized engine output for the steady state mode as pre-determined by a vehicle manufacturer or engine control system, as described above. If the engine output is determined to be optimized for the steady state mode, at 316, method 300 includes maintaining current operating conditions. If the engine output is not optimized for the steady state mode, method 300 returns to 302 to estimate engine conditions and further adjust controls as described in method 300 to achieve optimized engine output.

Method 300 may be repeated continuously as engine conditions may change throughout operation within a maintained operating mode. For example, conditions within a steady state mode or a transient mode may change and controls may be updated to maintain an optimized output. In another example, method 300 may be repeated in two minute increments during engine operation to determine if adjustment is requested for a transient mode.

FIGS. 4A-4B show an example method 400 for compensating cylinder parameter settings using sensor inputs. Method 400 continues from 310 of method 300, where method 300 includes adjusting cylinder parameter settings during a transient mode to optimize engine operation and output.

At 402, method 400 includes determining cylinder parameter settings for optimized transient output from transient tests and CAE models. Cylinder parameter settings may be signals from the controller to actuators of the engine, such as the fuel injector, cam shaft, spark plug, and so on. For example, a fuel injection timing setting may indicate to the fuel injector a frequency at which to inject fuel into the cylinder. A first fuel injection frequency used during a steady state mode may result in a steady state mode optimized output, e.g., a desired emissions level. A second fuel injection frequency used during a transient mode may result in a transient mode optimized output. The first fuel injection frequency and the second fuel injection frequency may be different and fuel injection frequency may be adjusted between the first fuel injection frequency and the second fuel injection frequency by adjusting the fuel injection timing setting. Transient tests and CAE models may indicate cylinder parameter settings which may result in an optimized output during the transient mode.

At 404, method 400 includes determining if a current cam timing setting being used by the camshaft matches the determined control parameter settings (e.g., cam timing setting) from 402. For example, the present cam timing setting may be the cam timing setting determined at 306 of FIG. 3. If the present cam timing setting does not match the determined cam timing setting, at 406, method 400 includes adjusting the cam timing setting. Adjusting the cam timing setting may include increasing a rotational speed of the camshaft such that intake valves and exhaust valves are opened and closed more frequently, or decreasing the rotational speed of the camshaft to decrease a frequency of opening and closing the intake valves and exhaust valves. Method 400 may proceed from 406 to 408, where method 400 includes measuring an engine output. Measuring engine output may include measuring emissions and fuel efficiency of the engine.

If at 404 it is determined the present cam timing setting matches the determined control parameter setting (e.g., determined at 402), the present cam timing setting may be maintained and method 400 may proceed to 408, where method 400 includes measuring engine output.

At 410, method 400 includes determining if engine output (e.g., measured at 408) is optimized. This may include comparing measured engine output to desired optimized engine output, as described at 314 of FIG. 3. Optimized engine output for the transient mode may be a fuel efficiency level, emissions level, or weighted average of fuel efficiency and emissions.

If engine output is determined to be optimized for the transient mode, at 412, method 400 includes maintaining the spark timing setting, maintaining the fuel injection timing setting, and maintaining the cam timing setting, which may have been adjusted at 406. The spark timing setting and the fuel injection timing setting may each be equal to the adjusted spark timing setting and the adjusted fuel injection timing setting from 306 of FIG. 3. Method 400 returns to 310 of FIG. 3.

In this way, the spark timing setting and the fuel injection timing setting indicated by the steady state mode look-up table may be used alongside the cam timing setting adjusted for the transient mode to optimize engine output for the transient mode. These cylinder parameter settings may be maintained throughout a duration of the transient mode, or method 400 may be repeated when cylinder parameters (e.g., cylinder temperature, fuel injection acceleration, etc.) change or when the optimized output changes (e.g., a different desired emissions level, fuel economy level, or a different weighted average thereof).

Returning to FIG. 4A, if at 410 it is determined engine output is not optimized for the transient mode, at 414, method 400 includes referring to determined control parameter settings from 402 to determine if further adjustment of cylinder parameter settings is requested to generate optimized output for the transient mode.

At 416, method 400 includes determining if the present spark timing setting being used by the spark plug matches the determined control parameter settings (e.g., spark timing setting) from 402. If the present spark timing setting does not match the determined spark timing setting, at 418, method 400 includes adjusting the spark timing setting. Adjusting the spark timing setting may include advancing the spark timing setting such that fuel in the cylinder is sparked earlier in the cylinder cycle, for example, during a compression stroke instead of during an expansion stroke. In another example, adjusting the spark timing setting may include increasing a frequency of spark, such that fuel in the cylinder is sparked more than once during the expansion stroke.

Method 400 proceeds from 418 to 420, where method 400 includes measuring an engine output. Measuring engine output may include measuring emissions and fuel efficiency of the engine.

If at 416 it is determined the present spark timing setting matches the determined control parameter setting, the present spark timing setting may be maintained and method 400 may proceed to 420, where method 400 includes measuring engine output, as described above.

At 422, method 400 includes determining if engine output (e.g., measured at 420) is optimized for the transient mode. This may include comparing measured engine output to desired optimized engine output for the transient mode. Optimized engine output may be a fuel efficiency level, emissions level, or weighted average of fuel efficiency and emissions and may be the same optimized engine output used at 410.

If engine output is determined to be optimized for the transient mode, at 424, method 400 includes maintaining the fuel injection timing setting, maintaining the cam timing setting, and maintaining the spark timing setting, which may have been adjusted at 418. Method 400 returns to 310 of FIG. 3.

In this way, a fuel injection timing setting indicated by a steady state mode look-up table may be used alongside the cam timing setting, which may have been adjusted for transient conditions at 406, and the spark timing setting, which may have been adjusted for transient conditions at 418, to optimize engine output for the transient mode. These cylinder parameter settings may be maintained throughout a duration of the transient mode or method 400 may be repeated when cylinder parameters (e.g., cylinder temperature, fuel injection acceleration, etc.) change or when the optimized output changes (e.g., a different desired emissions level, fuel economy level, or a different weighted average thereof).

If at 422 it is determined engine output is not optimized for the transient mode, method 400 proceeds to FIG. 4B where, at 426, method 400 includes referring to determined control parameter settings from 402 to determine if further adjustment of cylinder parameter settings is requested to generate optimized output for the transient mode.

At 428, method 400 includes determining if the present fuel injection timing setting being used by the fuel injector matches the determined control parameter settings (e.g., fuel injection timing setting) from 402. If the present fuel injection timing setting does not match the determined fuel injection timing setting, at 430, method 400 includes adjusting the fuel injection timing setting. Adjusting the fuel injection timing setting may include advancing fuel injection timing such that fuel is injected into the cylinder earlier in the cylinder cycle, for example, during a compression stroke as the piston is moving towards TDC instead of when the piston reaches TDC. In another example, adjusting the fuel injection timing setting may include increasing a frequency of fuel injection, such that fuel is injected into the cylinder more than once during the compression stroke.

Method 400 proceeds from 430 to 432, where method 400 includes measuring an engine output. Measuring engine output may include measuring emissions and fuel efficiency of the engine.

If at 428 it is determined the present fuel injection timing setting matches the determined control parameter setting, the present fuel injection timing setting may be maintained and method 400 may proceed to 432, where method 400 includes measuring engine output, as described above.

At 434, method 400 includes determining if engine output (e.g., measured at 432) is optimized for the transient mode. This may include comparing measured engine output to desired optimized engine output. Optimized engine output may be a fuel efficiency level, emissions level, or weighted average of fuel efficiency and emissions and may be the same optimized engine output used at 410 and 422.

If engine output is determined to be optimized for the transient mode, at 436, method 400 includes maintaining the cam timing setting, which may have been adjusted at 406, maintaining the spark timing setting, which may have been adjusted at 418, and maintaining the fuel injection timing setting, which may have been adjusted at 430. Method 400 returns to 310 of FIG. 3.

If engine output is determined to not be optimized for the transient mode at 434, method 400 returns to 402 to determine cylinder parameter settings for optimized transient output from transient tests and CAE models. After cylinder parameter settings for cam timing, spark timing, and fuel injection timing have been adjusted according to 406, 418, and 430, respectively, the resulting engine output may not be optimized if, for example, engine operating conditions such as real-time chamber temperature have changed since cylinder parameter settings were first determined at 402. By returning to 402, method 400 may determine if cylinder parameter settings for optimized transient output have changed and proceed through the steps of method 400 to adjust cylinder parameter settings accordingly.

In this way, the fuel injection timing setting, the cam timing setting, and the spark timing setting may be adjusted for transient conditions to optimize engine output for the transient mode. These cylinder parameter settings may be maintained throughout a duration of the transient mode or method 400 may be repeated when cylinder parameters (e.g., cylinder temperature, fuel injection acceleration, etc.) change or when the optimized output changes (e.g., a different desired emissions level, fuel economy level, or a different weighted average thereof).

Methods 300 and 400 as described in FIGS. 3 and FIGS. 4A-4B, respectively, describe example methods for adjusting cylinder parameter settings from steady state settings to cylinder parameter settings determined to provide an optimized engine output for a transient mode. Adjustments to cylinder parameter settings, e.g., advancing or delaying spark timing, are provided as example adjustments and other adjustments to the fuel injection timing setting, spark timing setting, and cam timing setting may be applied without departing from the scope of the herein described method.

Turning now to FIG. 5, a graph 500 illustrates an example engine operating sequence where cylinder parameter settings may each be adjusted based on fuel injection acceleration, engine speed rate, and chamber temperature. Cylinder parameter settings include a cam timing setting, a spark timing setting, and a fuel injection timing setting. The engine operating sequence may be implemented in an engine system of a vehicle including an engine such as engine 10 of FIG. 1. The engine control system may be implemented in the PCM of a controller, such as controller 12 of FIG. 1.

Graph 500 includes a plot 502, illustrating fuel injection acceleration, a plot 506 illustrating engine speed rate, a plot 510 illustrating chamber temperature, a plot 514 indicating a fuel injection timing setting, a plot 516 indicating a spark timing setting, and a plot 518 indicating a cam timing setting. Time increases along the x-axis from a left side to a right side of the figure.

For plots 502, 506, and 510, fuel injection acceleration, engine speed rate, and chamber temperature, respectively, increase upwards along the y-axis. In addition, plot 502 includes a fuel injection acceleration threshold 504, plot 506 includes an engine speed rate threshold 508, and plot 510 includes a chamber temperature threshold 512. Each of the fuel injection acceleration threshold 504 and the engine speed rate threshold 508 may be a non-zero value above which it is indicated that the engine is in a transient mode, as further described below. The chamber temperature threshold 512 may be a non-zero chamber temperature, e.g., a chamber temperature when the engine is in a nominal steady state mode.

Plots 514, 516, and 518 indicate if the fuel injection timing setting, the spark timing setting, and the cam timing setting, respectively, are adjusted to a first level, adjusted to a second level, or nominal. In one example, adjusting the fuel injection timing setting, the spark timing setting, and the cam timing setting refers to timing of each parameter modified to the first level or to the second level to optimize engine output during transient mode. The first level and the second level may be different for each of the cylinder parameter settings, as further described below. Nominal operation includes when the setting is operating at a setting used during steady state mode. Plot 502 shows fuel injection acceleration e.g., a rate at which a frequency of fuel injection changes. When plot 502 is greater than threshold 504, the engine is determined to be in the transient mode. When plot 502 is less than threshold 504, fuel injection acceleration may still fluctuate, however being below the threshold 504 indicates fluctuation is within an acceptable range to indicate the engine is in the steady state mode.

Plot 506 shows engine speed rate, e.g., a change in engine speed which may be derived from a crank position sensor. When plot 506 is greater than threshold 508, the engine is determined to be in the transient mode. Similar to fuel injection acceleration, engine speed rate may fluctuate while remaining below the threshold 508, which may be nominal fluctuations that occur while the engine remains in the steady state mode.

As shown by plots 502 and 506 and thresholds 504 and 508, engine speed rate plot 506 may intersect the threshold 508 later (e.g., between time t2 and time t3) than fuel injection acceleration plot 502 intersects the threshold 504 (e.g., at time t1). Thus, engine speed rate may indicate the engine is in the transient mode later than fuel injection acceleration indicates the engine is in the transient mode (e.g., indicating RPM lag). Therefore, using fuel injection acceleration as an indicator of transient mode and further to trigger a method for adjusting cylinder parameter controls to optimize engine output during the transient mode (e.g., as shown in FIGS. 3-4B) may allow for adjustment of cylinder parameter settings earlier in the transient mode compared using engine speed rate to indicate the transient mode.

At time t0, the engine is operating in the steady state mode as indicated by fuel injection acceleration plot 502 being below threshold 504 and engine speed rate plot 506 being below threshold 508. Additionally, though not a direct indicator of engine operating mode, chamber temperature plot 510 is approximately equal to threshold 512, which is an example nominal steady state chamber temperature. Between t0 and t1, the fuel injection timing setting, the spark timing setting, and the cam timing setting are nominal, (e.g., the cylinder parameter settings are operating as indicated for the steady state mode).

At t1, fuel injection acceleration plot 502 indicates the engine is in the transient mode by intersecting the threshold 504. Engine speed rate plot 506 is below threshold 508. Chamber temperature plot 510 increases to be greater than threshold 512 prior to t1 and continues to increase, showing chamber temperature is greater than the nominal steady state chamber temperature. As a result of indication that the engine is in the transient mode, the fuel injection timing setting, the spark timing setting, and the cam timing setting are adjusted to the first level at time t2. Although FIG. 5 shows the cylinder parameter settings adjusted at the same time to the same level (e.g., to the first level at time t2), other examples are possible. For example, the fuel injection timing setting may be adjusted at time t2 while the spark timing setting and the cam timing setting are adjusted at times between t2 and t3. In another example, one or two of the three cylinder parameter settings may be adjusted at the same time and the remaining cylinder parameter settings may not be adjusted (e.g., may be nominal), and so on for other combinations of adjusting the cylinder parameter settings at times following indication that the engine is in the transient mode.

In the example of FIG. 5, cylinder parameter settings are adjusted to the first level at time t2 to optimize engine output during the transient mode. Adjusting the fuel injection timing setting to the first level may include advancing the fuel injection timing setting such that fuel injection may occur earlier in the cylinder cycle. Adjusting the spark timing setting may include increasing a frequency of spark. Adjusting the cam timing setting may include increasing a camshaft rotational speed such that intake valves and exhaust valves open more frequently. Adjustments to the cylinder parameter settings may not be limited to those described herein; other adjustments and combinations of adjustments may be possible.

Between time t2 and time t3, engine speed rate plot 506 may intersect the threshold 508 (e.g., the conventional indicator that the engine is in the transient mode). Also between time t2 and time t3, fuel injection acceleration plot 502 may begin to decrease and chamber temperature plot 510 may begin to decrease. Adjusted cylinder parameters settings are maintained between times t2 and time t3.

At time t3, fuel injection acceleration plot 502 intersects threshold 504. For a first half of a duration between time t3 and time t4, fuel injection acceleration plot 502 is less than threshold 504. This may indicate the engine is no longer in the transient mode and has returned to the steady state mode. The steady state mode is further reflected by chamber temperature plot 510 being approximately equal to threshold temperature 512. Engine speed rate between time t3 and time t4 may be decreasing and crosses threshold 508 between time t3 and time t4. Additionally, at time t3, upon indication the engine is in the steady state mode, the fuel injection timing setting, the spark timing setting, and the cam timing setting may return to nominal operation to optimize engine output during the steady state.

For a second half of the duration between time t3 and time t4, fuel injection acceleration increases and, at time t4, fuel injection acceleration intersects threshold 504, indicating the engine is in the transient mode. The transient mode occurring as indicated at time t4 (e.g., a first transient mode) is a different transient mode than the transient mode occurring as indicated at time t1 (e.g., a second transient mode). For example, during the second transient mode, chamber temperature plot 510 may decrease below the threshold 512 and engine speed rate may remain below threshold 508 for a first half of a duration between time t5 and time t6. Therefore, adjustment to the cylinder parameter settings for the second transient mode may be different compared to adjustments made for the first transient mode. An optimized output of the engine for the second transient mode may be different from the optimized output of the engine for the first transient mode, e.g., due to different chamber temperatures. In another example, the optimized output of the engine for the first transient mode and for the second transient mode may be the same, however, because cylinder temperature for the first transient mode is different from cylinder temperature for the second transient mode, the cylinder parameter settings may be differently adjusted to compensate for the different cylinder temperature to achieve the optimized output.

At time t5, the fuel injection timing setting, the spark timing setting, and the cam timing setting are adjusted to a second level which may be different from the first level. For example, adjusting the fuel injection timing setting to the second level may include delaying the fuel injection timing setting such that fuel injection may occur later in the cylinder cycle. Adjusting the spark timing setting may include decreasing a frequency of spark. Adjusting the cam timing setting may include decreasing a camshaft rotational speed such that intake valves and exhaust valves open less frequently. Adjusted cylinder parameter settings are maintained between time t5 and time t6. Also between time t5 and time t6, engine speed rate plot 506 may increase to cross threshold 508, e.g., the conventional indicator of the transient mode. However, since the second transient mode has already been indicated by fuel injection acceleration plot 502 intersecting the threshold 504 at time t4, engine speed rate plot 506 crossing threshold 508 might not contribute to adjusting cylinder parameter settings.

At time t6, fuel injection acceleration intersects threshold 504 and is less than threshold 504 after time t6, indicating the engine has returned to the steady state mode. Additionally, chamber temperature plot 510 may equal threshold 512, indicating chamber temperature plot 510 has returned to nominal for the steady state mode. As a result, the fuel injection timing setting, the spark timing setting, and the cam timing setting may return to nominal operation (e.g., to optimize engine output for the steady state mode). After time t6, engine speed rate plot 506 may decrease to intersect threshold 508, indicating the engine is in the steady state mode, which has previously been indicated by fuel injection acceleration plot 502 intersecting threshold 504 at time t6.

In FIG. 5, the fuel injection timing setting, the spark timing setting, and the cam timing setting are shown to be adjusted at the same time. However, in other examples, the cylinder parameter settings may be adjusted one at a time or at least one of the cylinder parameter settings may not be adjusted (e.g., may be nominal during the transient mode).

In this way, the cylinder parameter settings including the fuel injection timing setting, the spark timing setting, and the cam timing setting may be adjusted to provide the optimized engine output during the transient mode. The adjustment of the cylinder parameter settings (e.g., an amount by which a setting is advanced/delayed or a frequency is increased/decreased) may be controlled by cylinder conditions, such as the chamber temperature. Methods used to adjust the cylinder parameter settings may be applied to the engine by the controller upon indication that the engine is in the transient mode, as indicated by fuel injection acceleration being greater than the positive, non-zero threshold. Using adjusted cylinder parameter settings during the transient mode as opposed to using steady state cylinder parameter settings during the transient mode, as is conventional, may result in optimized engine output during both the transient mode and during the steady state mode. Optimized engine output may be an emissions level, a fuel efficiency level, or a weighted average of emissions and fuel efficiency. In one example, the optimized output during the steady state mode may be different from the optimized output during the transient mode. Therefore, adjusting the cylinder parameter settings may allow for achievement of the new optimized output. In another example, the optimized output for the transient mode and for the steady state mode may be the same (e.g., the same emissions level, fuel efficiency level, or weighted average thereof). As cylinder conditions (e.g., chamber temperature, pressure, etc.) may be different for the transient mode compared to the steady state mode, adjusting cylinder parameter settings may allow achievement of the optimized output under new cylinder conditions generated during the transient mode.

The technical effect of adjusting the cylinder parameter settings based on fuel injection acceleration and chamber temperature is that vehicle emissions may be reduced, resulting in less soot, NO, and other potentially harmful emissions being released to the atmosphere, and vehicle fuel efficiency may be increased compared to when steady state cylinder parameter settings are used during the transient mode, allowing for increased vehicle power, distance traveled, or engine combustion for a given amount of fuel.

The disclosure also provides support for a method for controlling an engine, comprising: adjusting a cylinder parameter setting based on a chamber temperature in response to a rate of fuel injection acceleration greater than a positive threshold. In a first example of the method, the cylinder parameter setting is a spark timing setting. In a second example of the method, optionally including the first example, the cylinder parameter setting is a cam timing setting. In a third example of the method, optionally including one or both of the first and second examples, the cylinder parameter setting is a fuel injection timing setting. In a fourth example of the method, optionally including one or more or each of the first through third examples, the method further comprises: when a chamber temperature is less than a first temperature threshold, adjusting the cylinder parameter setting by a first amount in response to the rate of fuel injection acceleration being greater than the positive threshold, and when a chamber temperature is greater than the first temperature threshold, adjusting the cylinder parameter setting by a second amount, smaller than the first amount, in response to the rate of fuel injection acceleration being greater than the positive threshold. In a fifth example of the method, optionally including one or more or each of the first through fourth examples, when the chamber temperature is less than the first temperature threshold, advancing a spark timing setting by the first amount in response to the rate of fuel injection acceleration being greater than the positive threshold, and when the chamber temperature is greater than the first temperature threshold, delaying the spark timing setting by the second amount, equal to the first amount, in response to the rate of fuel injection acceleration being greater than the positive threshold. In a sixth example of the method, optionally including one or more or each of the first through fifth examples, when the chamber temperature is less than the first temperature threshold, advancing a fuel injection timing setting by the first amount in response to the rate of fuel injection acceleration being greater than the positive threshold, and when the chamber temperature is greater than the first temperature threshold, delaying the fuel injection timing setting by the second amount, equal to the first amount, in response to the rate of fuel injection acceleration being greater than the positive threshold. In a seventh example of the method, optionally including one or more or each of the first through sixth examples, when the chamber temperature is less than the first temperature threshold, delaying a cam timing setting by the first amount in response to the rate of fuel injection acceleration being greater than the positive threshold, and when the chamber temperature is greater than the first temperature threshold, advancing the cam timing setting by the second amount, equal to the first amount, in response to the rate of fuel injection acceleration being greater than the positive threshold. In an eighth example of the method, optionally including one or more or each of the first through seventh examples, the method further comprises: when the chamber temperature is less than the first temperature threshold, increasing the cylinder parameter setting by the first amount in response to the rate of fuel injection acceleration being greater than the positive threshold, and when the chamber temperature is greater than the first temperature threshold, maintaining the cylinder parameter setting in response to the rate of fuel injection acceleration being greater than the positive threshold. In a ninth example of the method, optionally including one or more or each of the first through eighth examples, the method further comprises measuring engine emissions and calculating engine fuel economy to determine an engine output as a result of using adjusted cylinder parameter settings. In a tenth example of the method, optionally including one or more or each of the first through ninth examples, the method further comprises, further adjusting the cylinder parameter settings to match the engine output produced as the result of using adjusted cylinder parameter settings with a pre-determined engine output.

The disclosure also provides support for an engine system comprising: a combustion chamber configured with a spark plug, intake and exhaust valves variably opened and closed using a camshaft, a fuel injector, and a controller configured with computer readable instructions stored on non-transitory memory that when executed cause the controller to adjust a timing of the spark plug, a timing of the camshaft, and a timing of the fuel injector based on a temperature of the combustion chamber in response to a rate of fuel injection rising above a positive threshold. In a first example of the system, the timing of the spark plug is a timing of spark initiation as actuated based on a spark timing setting. In a second example of the system, optionally including the first example, the timing of the camshaft is a rate of camshaft rotation to increase or decrease opening and closing of intake and exhaust valves as actuated based on a cam timing setting. In a third example of the system, optionally including one or both of the first and second examples, the timing of the fuel injector is a frequency of fuel injections as actuated based on a fuel injection timing setting. In a fourth example of the system, optionally including one or more or each of the first through third examples, the temperature of the combustion chamber is calculated in real-time by an engine control unit or powertrain control unit of the engine using a piston-top temperature measurement. In a fifth example of the system, optionally including one or more or each of the first through fourth examples, fuel injection acceleration is derived from a duration of fuel injection. In a sixth example of the system, optionally including one or more or each of the first through fifth examples, adjustment of the timing of the spark plug, the timing of the camshaft, and the timing of the fuel injection is adjusted from a spark plug timing, a camshaft timing, and a fuel injection timing, respectively, used during a steady state engine mode. In a seventh example of the system, optionally including one or more or each of the first through sixth examples, the system further comprises: an emissions control system of the engine, wherein emissions and fuel economy of the engine are measured and the timing of the spark plug, the timing of the camshaft, and the timing of the fuel injector are further adjusted to match the emissions and fuel economy of the engine with a pre-determined engine output. In an eighth example of the system, optionally including one or more or each of the first through seventh examples, the pre-determined engine output may be set by a user or by a vehicle manufacturer and wherein the pre-determined engine output is one of a fuel economy value, an emissions value, or a weighted average thereof.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine, comprising:
adjusting a cylinder parameter setting based on a chamber temperature in response to a rate of fuel injection acceleration greater than a positive threshold.

2. The method of claim 1, wherein the cylinder parameter setting is a spark timing setting.

3. The method of claim 1, wherein the cylinder parameter setting is a cam timing setting.

4. The method of claim 1, wherein the cylinder parameter setting is a fuel injection timing setting.

5. The method of claim 1, wherein the method further comprises:
when a chamber temperature is less than a first temperature threshold, adjusting the cylinder parameter setting by a first amount in response to the rate of fuel injection acceleration being greater than the positive threshold; and
when a chamber temperature is greater than the first temperature threshold, adjusting the cylinder parameter setting by a second amount, smaller than the first amount, in response to the rate of fuel injection acceleration being greater than the positive threshold.

6. The method of claim 5, wherein:
when the chamber temperature is less than the first temperature threshold, advancing a spark timing setting by the first amount in response to the rate of fuel injection acceleration being greater than the positive threshold; and
when the chamber temperature is greater than the first temperature threshold, delaying the spark timing setting by the second amount, equal to the first amount, in response to the rate of fuel injection acceleration being greater than the positive threshold.

7. The method of claim 5, wherein:
when the chamber temperature is less than the first temperature threshold, advancing a fuel injection timing setting by the first amount in response to the rate of fuel injection acceleration being greater than the positive threshold; and when the chamber temperature is greater than the first temperature threshold, delaying the fuel injection timing setting by the second amount, equal to the first amount, in response to the rate of fuel injection acceleration being greater than the positive threshold.

8. The method of claim 5, wherein:

when the chamber temperature is less than the first temperature threshold, delaying a cam timing setting by the first amount in response to the rate of fuel injection acceleration being greater than the positive threshold; and when the chamber temperature is greater than the first temperature threshold, advancing the cam timing setting by the second amount, equal to the first amount, in response to the rate of fuel injection acceleration being greater than the positive threshold.

9. The method of claim 5, wherein the method further comprises:

when the chamber temperature is less than the first temperature threshold, increasing the cylinder parameter setting by the first amount in response to the rate of fuel injection acceleration being greater than the positive threshold; and when the chamber temperature is greater than the first temperature threshold, maintaining the cylinder parameter setting in response to the rate of fuel injection acceleration being greater than the positive threshold.

10. The method of claim 1, further comprising, measuring engine emissions and calculating engine fuel economy to determine an engine output as a result of using adjusted cylinder parameter settings.

11. The method of claim 10, further comprising, further adjusting the cylinder parameter settings to match the engine output produced as the result of using adjusted cylinder parameter settings with a pre-determined engine output.

12. An engine system comprising:
a combustion chamber configured with:
a spark plug;
intake and exhaust valves variably opened and closed using a camshaft;
a fuel injector; and a controller configured with computer readable instructions stored on non-transitory memory that when executed cause the controller to:

adjust a timing of the spark plug, a timing of the camshaft, and a timing of the fuel injector based on a temperature of the combustion chamber in response to a rate of fuel injection rising above a positive threshold.

13. The system of claim 12, wherein the timing of the spark plug is a timing of spark initiation as actuated based on a spark timing setting.

14. The system of claim 12, wherein the timing of the camshaft is a rate of camshaft rotation to increase or decrease opening and closing of intake and exhaust valves as actuated based on a cam timing setting.

15. The system of claim 12, wherein the timing of the fuel injector is a frequency of fuel injections as actuated based on a fuel injection timing setting.

16. The system of claim 12, wherein the temperature of the combustion chamber is calculated in real-time by an engine control unit or powertrain control unit of the engine using a piston-top temperature measurement.

17. The system of claim 12, wherein fuel injection acceleration is derived from a duration of fuel injection.

18. The system of claim 12, wherein adjustment of the timing of the spark plug, the timing of the camshaft, and the timing of the fuel injection is adjusted from a spark plug timing, a camshaft timing, and a fuel injection timing, respectively, used during a steady state engine mode.

19. The system of claim 12, further comprising an emissions control system of the engine, wherein emissions and fuel economy of the engine are measured and the timing of the spark plug, the timing of the camshaft, and the timing of the fuel injector are further adjusted to match the emissions and fuel economy of the engine with a pre-determined engine output.

20. The system of claim 19, wherein the pre-determined engine output may be set by a user or by a vehicle manufacturer and wherein the pre-determined engine output is one of a fuel economy value, an emissions value, or a weighted average thereof.

* * * * *